(12) United States Patent  
Ohtomo et al.

(10) Patent No.: US 9,105,941 B2
(45) Date of Patent: Aug. 11, 2015

(54) LITHIUM ION CONDUCTING MATERIAL AND LITHIUM BATTERY

(75) Inventors: Takamasa Ohtomo, Susono (JP); Koji Kawamoto, Susono (JP); Shigenori Hama, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 476 days.

(21) Appl. No.: 13/510,737

(22) PCT Filed: Nov. 18, 2010

(86) PCT No.: PCT/IB2010/003126
§ 371 (c)(1),
(2), (4) Date: May 18, 2012

(87) PCT Pub. No.: WO2011/064662
PCT Pub. Date: Jun. 3, 2011

(65) Prior Publication Data
US 2012/0231348 A1 Sep. 13, 2012

(30) Foreign Application Priority Data

Nov. 25, 2009 (JP) .................................. 2009-267450

(51) Int. Cl.
*H01M 10/0562* (2010.01)
*H01M 10/052* (2010.01)
(52) U.S. Cl.
CPC ........ *H01M 10/0562* (2013.01); *H01M 10/052* (2013.01); *Y02E 60/122* (2013.01)
(58) Field of Classification Search
None
See application file for complete search history.

(56) References Cited

U.S. PATENT DOCUMENTS

| 6,066,417 | A | * | 5/2000 | Cho et al. | 429/303 |
| 2005/0145137 | A1 | * | 7/2005 | Buras et al. | 106/284.3 |
| 2007/0160911 | A1 | | 7/2007 | Senga et al. | |
| 2010/0047691 | A1 | * | 2/2010 | Kawakami | 429/221 |
| 2011/0129723 | A1 | | 6/2011 | Tsuchida | |
| 2012/0077078 | A1 | * | 3/2012 | Tsuchida | 429/163 |

FOREIGN PATENT DOCUMENTS

| JP | 11-176236 A | 7/1999 |
| JP | 11-219722 A | 8/1999 |
| JP | 2002-109955 A | 4/2002 |
| JP | 2005-228570 A | 8/2005 |

(Continued)

OTHER PUBLICATIONS

International Search Report and Written Opinion for corresponding International Patent Application No. PCT/IB2010/003126 mailed Apr. 6, 2011.

(Continued)

*Primary Examiner* — Ula C Ruddock
*Assistant Examiner* — Daniel Gatewood
(74) *Attorney, Agent, or Firm* — Sughrue Mion, PLLC

(57) ABSTRACT

A lithium ion conducting material includes a sulfide-based solid electrolyte material that contains Li, an element that belongs to group 13 to group 15 and S, and that contains an $MS_x$ unit, wherein M is an element that belongs to group 13 to group 15, S is a sulfur element, and x is the maximum number of S atoms that can be bonded with M, and an inhibitor that is in contact with the sulfide-based solid electrolyte material and that contains a metal element having an ionization tendency lower than that of hydrogen.

20 Claims, 3 Drawing Sheets

(56) References Cited

FOREIGN PATENT DOCUMENTS

| | | | |
|---|---|---|---|
| JP | 2008-103245 A | 5/2008 | |
| JP | 2008-103283 A | 5/2008 | |
| JP | 2009-193802 A | 8/2009 | |
| KR | 10-2009-0086462 A | 8/2009 | |
| WO | WO 2008050903 A1 | * | 5/2008 |
| WO | 2008/099656 A1 | 8/2008 | |
| WO | WO 2008099656 A1 | * | 8/2008 |

OTHER PUBLICATIONS

International Preliminary Report on Patentability for corresponding International Patent Application No. PCT/IB2010/003126 issued on Sep. 30, 2011.

Japanese Office Action for corresponding JP Patent Application No. 2009-267450 issued on Nov. 25, 2011.

* cited by examiner

LITHIUM ION CONDUCTING MATERIAL AND LITHIUM BATTERY

BACKGROUND OF THE INVENTION

1. Field of the Invention

The invention relates to a lithium ion conducting material in which the amount of produced hydrogen sulfide is reduced by stabilizing a sulfur component before hydrogen sulfide is produced.

2. Description of the Related Art

With a rapid proliferation of information-related equipment and communication equipment, such as personal computers, camcorders and cellular phones, in recent years, it becomes important to develop a battery used as a power supply of the information-related equipment or the communication equipment. In addition, in automobile industry, or the like, development of a high-power and high-capacity battery for electric vehicles or hybrid vehicles has been proceeding. Currently, among various types of battery, a lithium battery becomes a focus of attention in terms of high energy density.

Most of currently commercially available lithium batteries employ an electrolytic solution that contains a flammable organic solvent. Therefore, a safety device, which restricts temperature rise when short circuit occurs, needs to be attached to these lithium batteries, or the structure and the material of the lithium batteries need to be improved to prevent the short circuit.

In contrast to this, all-solid lithium batteries that replace an electrolytic solution with a solid electrolyte layer do not use a flammable organic solvent in the batteries. For this reason, it is considered that the all-solid lithium batteries are excellent in manufacturing cost and productivity. Furthermore, a sulfide-based solid electrolyte material is known as a solid electrolyte material used for the solid electrolyte layer (for example, see Japanese Patent Application Publication No. 2002-109955 (JP-A-2002-109955)).

The sulfide-based solid electrolyte material has a high lithium ion conductivity, so it is useful to obtain a high-power battery. However, when the sulfide-based solid electrolyte material contacts water (including moisture; the same applies to the following description), hydrogen sulfide may be produced. Therefore, various researches have been pursued on a technique for trapping hydrogen sulfide produced. For example, Japanese Patent Application Publication No. 2008-103245 (JP-A-2008-103245) describes a sulfide-based secondary battery in which the outer peripheral portion of a cell is covered with a substance (alkaline chemical compound) that traps and detoxifies hydrogen sulfide gas. In addition, Japanese Patent Application Publication No. 2008-103283 (JP-A-2008-103283) describes an all-solid battery in which a sulfide-based all-solid battery element is covered with a sheathing material made of thermosetting resin and then the sheathing material is further covered with an adsorbent and/or an alkaline substance-containing material.

In JP-A-2008-103245 and JP-A-2008-103283, an adsorber or an alkaline substance is used to trap hydrogen sulfide; however, the adsorber or the alkaline substance originally does not inhibit production of hydrogen sulfide.

The inventors diligently studied and found that a sulfur component may be stabilized before hydrogen sulfide is produced in such a manner that an inhibitor that contains a metal element having an ionization tendency lower than that of hydrogen is used, and reached the invention.

SUMMARY OF INVENTION

The invention provides a lithium ion conducting material in which the amount of produced hydrogen sulfide is reduced.

A first aspect of the invention provides a lithium ion conducting material. The lithium ion conducting material includes a sulfide-based solid electrolyte material that contains Li, an element that belongs to group 13 to group 15 and S, and that contains an $MS_x$ unit, wherein M is an element that belongs to group 13 to group 15, S is a sulfur element, and x is the maximum number of S atoms that can be bonded with M, and an inhibitor that is in contact with the sulfide-based solid electrolyte material and that contains a metal element having an ionization tendency lower than that of hydrogen.

According to the above aspect, the inhibitor that contains a metal element having an ionization tendency lower than that of hydrogen is used, so a sulfur component may be stabilized before hydrogen sulfide is produced. Therefore, it is possible to reduce the amount of produced hydrogen sulfide, and it is possible to obtain a lithium ion conducting material having a high level of safety.

In the above aspect, the metal element of the inhibitor may be copper. This is because copper is low in cost and has a high level of safety.

In the above aspect, the inhibitor may be copper oxide. This is because a sulfur component may be efficiently stabilized before hydrogen sulfide is produced.

In the above aspect, the sulfide-based solid electrolyte material may be substantially free of bridging sulfur or $Li_2S$. This is because it is possible to inhibit production of hydrogen sulfide due to bridging sulfur and $Li_2S$ and, therefore, the amount of produced hydrogen sulfide may be reduced as a whole.

In the above aspect, the element of group 13 to group 15 may be P, and the $MS_x$ unit may be a $PS_4$ unit. Furthermore, in the above aspect, the sulfide-based solid electrolyte material may be formed by vitrifying a material composition that contains $Li_2S$ and $P_2S_5$.

In the above aspect, the ratio of $Li_2S$ and $P_2S_5$ contained in the material composition may be $Li_2S:P_2S_5=70:30$ to $85:15$ on a molar basis. This is because the sulfide-based solid electrolyte material has an ortho composition or a composition close to the ortho composition and, therefore, the amount of produced hydrogen sulfide is small.

In the above aspect, the element of group 13 to group 15 may be Ge, and the $MS_x$ unit may be a $GeS_4$ unit. Furthermore, in the above aspect, the sulfide-based solid electrolyte material may be formed by vitrifying a material composition that contains $Li_2S$ and $GeS_2$.

In the above aspect, the ratio of $Li_2S$ and $GeS_2$ contained in the material composition may be $Li_2S:GeS_2=50:50$ to $80:20$ on a molar basis. This is because the sulfide-based solid electrolyte material has an ortho composition or a composition close to the ortho composition and, therefore, the amount of produced hydrogen sulfide is small.

In the above aspect, the element of group 13 to group 15 may be Si, and the $MS_x$ unit may be an $SiS_4$ unit. Furthermore, in the above aspect, the sulfide-based solid electrolyte material may be formed by vitrifying a material composition that contains $Li_2S$ and $SiS_2$.

In the above aspect, the ratio of $Li_2S$ and $SiS_2$ contained in the material composition may be $Li_2S:SiS_2=50:50$ to $80:20$ on a molar basis. This is because the sulfide-based solid electrolyte material has an ortho composition or a composition close to the ortho composition and, therefore, the amount of produced hydrogen sulfide is small.

A second aspect of the invention provides a lithium battery. The lithium battery includes a positive electrode active material layer that contains a positive electrode active material, a negative electrode active material layer that contains a negative electrode active material, and an electrolyte layer that is formed between the positive electrode active material layer and the negative electrode active material layer, wherein at least one of the positive electrode active material layer, the negative electrode active material layer and the electrolyte layer contains the above described lithium ion conducting material.

According to the above aspect, by using the above described lithium ion conducting material, the lithium battery that produces a less amount of hydrogen sulfide may be obtained.

According to the above aspects, it is advantageously possible to provide a lithium ion conducting material that reduces the amount of produced hydrogen sulfide by stabilizing a sulfur component before hydrogen sulfide is produced.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, a lithium ion conducting material and a lithium battery according to an embodiment of the invention will be described in detail.

A. Lithium Ion Conducting Material

First, the lithium ion conducting material according to the present embodiment will be described. The lithium ion conducting material according to the present embodiment includes a sulfide-based solid electrolyte material that contains Li, an element that belongs to group 13 to group 15 and S, and that contains an $MS_x$ unit (M is an element that belongs to group 13 to group 15, S is a sulfur element, and x is the maximum number of S atoms that can be bonded with M); and an inhibitor that is in contact with the sulfide-based solid electrolyte material and that contains a metal element having an ionization tendency lower than that of hydrogen.

According to the present embodiment, the inhibitor that contains a metal element having an ionization tendency lower than that of hydrogen is used, so a sulfur component may be stabilized before hydrogen sulfide is produced. Therefore, it is possible to reduce the amount of produced hydrogen sulfide, and it is possible to obtain a lithium ion conducting material having a high level of safety. In addition, as described above, there is known a technique for trapping hydrogen sulfide using an alkaline substance, or the like, after hydrogen sulfide is produced; however, this technique does not inhibit production of hydrogen sulfide. In contrast to this, the lithium ion conducting material according to the present embodiment traps a sulfur component (for example, $PS_4^{3-}$) using the inhibitor (for example, CuO) to stabilize the sulfur component before hydrogen sulfide is produced to thereby reduce the amount of produced hydrogen sulfide. Therefore, the inhibitor according to the present embodiment completely differs in a trapping object from the existing hydrogen sulfide trapping material. Note that the mechanism that a sulfur component may be stabilized before hydrogen sulfide is produced will be described later.

Figure 1:
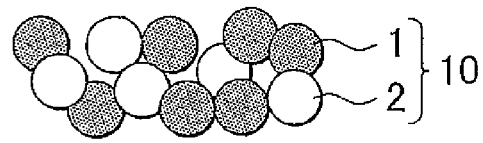
FIG. 1 is a view that illustrates an example of a lithium ion conducting material according to an embodiment of the invention.

The lithium ion conducting material 10 shown in FIG. 1 includes a sulfide-based solid electrolyte material 1 and an inhibitor 2 that is in contact with the sulfide-based solid electrolyte material 1. Furthermore, in the present embodiment, the sulfide-based solid electrolyte material 1 contains Li, an element that belongs to group 13 to group 15 and S, and that contains an $MS_x$ unit (M is an element that belongs to group 13 to group 15, S is a sulfur element, and x is the maximum number of S atoms that can be bonded with M). In addition, the inhibitor 2 is a chemical compound having an ionization tendency lower than that of hydrogen.

Next, the $MS_x$ unit according to the present embodiment will be described. The $MS_x$ unit is one of units that constitute the sulfide-based solid electrolyte material. The $MS_x$ units according to the present embodiment are exemplified below.

[Chemical Formula 1]

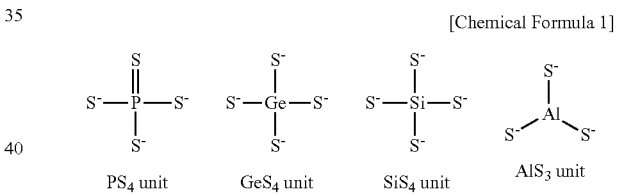

The suffix x of the $MS_x$ unit is a number corresponding to the valence of M, and is usually the maximum number of S atoms that can be bonded with M. A $PS_4$ unit is formed so that four S atoms (x=4) are bonded with P in accordance with the valence of P (pentavalence). In the $PS_4$ unit, because P is pentavalent, one of four bonded S atoms is bonded in double bond. In addition, a $GeS_4$ unit and an $SiS_4$ unit are respectively formed so that four S atoms (x=4) are bonded with Ge and Si in accordance with the valence of Ge (tetravalence) and the valence of Si (tetravalence). Similarly, an $AlS_3$ unit is formed so that three S atoms are bonded with Al in accordance with the valence of Al (trivalence). Although not shown in the chemical formulas, $Li^+$ is present as a counter for $S^-$ of each unit.

Next, the mechanism that the inhibitor according to the present embodiment is able to stabilize a sulfur component before hydrogen sulfide is produced will be described. For example, it is assumed that $75Li_2S.25P_2S_5$ glass is used as the sulfide-based solid electrolyte material. The $75Li_2S.25P_2S_5$ glass is formed by vitrifying a material composition obtained by mixing $Li_2S$ and $P_2S_5$ at the ratio of $Li_2S:P_2S_5=75:25$ on a molar basis. Furthermore, the $75Li_2S.25P_2S_5$ glass may also be expressed using $Li_3PS_4$, and is theoretically formed of only the $PS_4$ unit.

As will be described in a first comparative example later, when the 75Li$_2$S.25P$_2$S$_5$ glass contacts water, the 75Li$_2$S.25P$_2$S$_5$ glass produces a slight amount of hydrogen sulfide. Then, when the 75Li$_2$S.25P$_2$S$_5$ glass that has already produced hydrogen sulfide is subjected to X-ray diffractometry (XRD), production of Li$_3$PO$_4$ is confirmed. From the result, the mechanism that hydrogen sulfide is produced from the 75Li$_2$S.25P$_2$S$_5$ glass is presumed as follows.

$$Li_3PS_4 + 3H_2O \rightarrow 3LiOH + H_3PS_4 \quad (1)$$

$$H_3PS_4 + 4H_2O \rightarrow H_3PO_4 + 4H_2S\uparrow \quad (2)$$

$$3LiOH + H_3PO_4 \rightarrow Li_3PO_4 + 3H_2O\uparrow \quad (3)$$

That is, in the formula (1), Li$_3$PS$_4$ reacts with H$_2$O to be ionized to thereby produce LiOH and H$_3$PS$_4$. It is presumable that the above reaction definitely occurs because an Li$_3$PS$_4$ solution is basic. Subsequently, in the formula (2), H$_3$PS$_4$ further reacts with H$_2$O to produce H$_2$S (hydrogen sulfide). After that, it is presumable that, in the formula (3), moisture is removed from LiOH produced in the formula (1) and H$_3$PO$_4$ produced in the formula (2) by drying to thereby produce Li$_3$PO$_4$.

In contrast to this, as will be described in an example later, the lithium ion conducting material that contains 75Li$_2$S.25P$_2$S$_5$ glass and CuO (inhibitor) may significantly reduce the amount of produced hydrogen sulfide as compared with when the lithium ion conducting material contains only the 75Li$_2$S.25P$_2$S$_5$ glass. Then, when the lithium ion conducting material that has already produced hydrogen sulfide is subjected to X-ray diffractometry (XRD), production of Cu$_3$PS$_4$ is confirmed. From the result, the reaction mechanism of the lithium ion conducting material and water is presumed as follows.

$$Li_3PS_4 + 3H_2O \rightarrow 3LiOH + H_3PS_4 \quad (1)$$

$$H_3PS_4 + 3CuO \rightarrow Cu_3PS_4 \quad (4)$$

Note that, although the reason is not clear, the valence of Cu of Cu$_3$PS$_4$ in the formula (4) is presumably reduced from bivalence to monovalence. Cu may be monovalent or bivalent, so it is presumable that bivalent Cu (CuO) is reduced because of some reason.

When comparing the formula (2) with the formula (4), H$_3$PS$_4$ reacts with H$_2$O to produce H$_2$S (hydrogen sulfide) in the formula (2), whereas H$_3$PS$_4$ reacts with CuO that is an oxide of a metal element (Cu) having an ionization tendency lower than that of hydrogen to produce Cu$_3$PS$_4$ in the formula (4). If not CuO but an inhibitor MX that contains a metal element having an ionization tendency higher than that of hydrogen is used, the ionization tendency of M is higher than the ionization tendency of H even when H$_3$PS$_4$ reacts with MX to produce MPS$_4$, so H$_3$PS$_4$ is produced again and then the H$_3$PS$_4$ reacts with water to produce H$_2$S (hydrogen sulfide). In contrast to this, by using an inhibitor that contains a metal element having an ionization tendency lower than that of hydrogen, H$_3$PS$_4$ is not produced again, and a sulfur component may be stabilized before hydrogen sulfide is produced. Hereinafter, the lithium ion conducting material according to the present embodiment will be described component by component.

1. Sulfide-Based Solid Electrolyte Material

The sulfide-based solid electrolyte material according to the present embodiment contains Li, an element that belongs to group 13 to group 15 and S, and contains an MS$_x$ unit (M is an element that belongs to group 13 to group 15, S is a sulfur element, and x is the maximum number of S atoms that can be bonded with M).

The MS$_x$ unit may be confirmed, for example, by Raman spectroscopy. For example, the peak of the PS$_4$ unit normally appears at 417 cm$^{-1}$. Therefore, if the sulfide-based solid electrolyte material has the peak, it may be determined that the sulfide-based solid electrolyte material contains the PS$_4$ unit. Similarly, each of MS$_x$ units other than the PS$_4$ unit may also be determined by Raman spectroscopy on the basis of whether the peak of the MS$_x$ unit appears. In addition, other than Raman spectroscopy, the presence of the MS$_x$ unit may be confirmed through the composition ratio of the material composition or the results of Nuclear Magnetic Resonance (NMR). In addition, particularly, the PS$_4$ unit may also be confirmed by $^{31}$P Magic Angle Spinning Nuclear Magnetic Resonance ($^{31}$PMASNMR) (the peak of the PS$_4$ unit=83 ppm).

In addition, the sulfide-based solid electrolyte material contains an element of group 13 to group 15, and desirably may contain an element of group 14 or group 15. This is because the sulfide-based solid electrolyte material that produces a less amount of hydrogen sulfide may be obtained. The element of group 13 to group 15 is not specifically limited. The element of group 13 to group 15 may be P, Si, Ge, As, Sb, Al, or the like, desirably may be P, Si or Ge, and more desirably may be P. This is because the sulfide-based solid electrolyte material that produces a less amount of hydrogen sulfide and that has a high lithium ion conductivity may be obtained.

The sulfide-based solid electrolyte material according to the present embodiment is not specifically limited as long as the sulfide-based solid electrolyte material contains Li, an element of group 13 to group 15 and S, and further contains an MS$_x$ unit. The sulfide-based solid electrolyte material may be desirably obtained by vitrifying a material composition that contains Li$_2$S and a sulfide of an element of group 13 to group 15. This is because the sulfide-based solid electrolyte material may have a high lithium ion conductivity.

The amount of the impurities in Li$_2$S contained in the material composition may be small. When the amount of the impurities in Li$_2$S contained in the material composition is small, a side reaction may be suppressed. A method of synthesizing Li$_2$S may be, for example, a method described in Japanese Patent Application Publication No. 7-330312 (JP-A-7-330312). Furthermore, Li$_2$S may be refined by a method described in WO2005/040039. On the other hand, the sulfide of the element of group 13 to group 15 contained in the material composition may be, for example, P$_2$S$_3$, P$_2$S$_5$, SiS$_2$, GeS$_2$, As$_2$S$_3$, Sb$_2$S$_3$, Al$_2$S$_3$, or the like.

A method of vitrifying the material composition may be, for example, mechanical milling or melt extraction, and may be desirably mechanical milling. This is because treatment may be performed at room temperature to thereby make it possible to simplify the manufacturing process. Mechanical milling is not specifically limited as long as the material composition is mixed while imparting mechanical energy. The mechanical milling may be, for example, ball mill, turbo mill, mechanofusion, disk mill, or the like, may be desirably ball mill, and more desirably may be planetary ball mill. This is because a desired sulfide-based solid electrolyte material may be efficiently obtained.

In addition, conditions of mechanical milling are set so that a desired sulfide-based solid electrolyte material may be obtained. For example, when a sulfide-based solid electrolyte material is prepared by planetary ball mill, a material composition and milling balls are placed in a pot and then subjected to treatment at a predetermined rotational speed for a predetermined period of time. Generally, as the rotational speed increases, the rate of production of the sulfide-based solid electrolyte material increases, and, as the treatment time elongates, the degree of conversion from the material composition to the sulfide-based solid electrolyte material increases. The rotational speed at which planetary ball mill is performed may range, for example, from 200 rpm to 500 rpm, and desirably may range from 250 rpm to 400 rpm. In addition, the treatment time during which planetary ball mill is performed may range, for example, from an hour to 100 hours and desirably may range from an hour to 50 hours.

The sulfide-based solid electrolyte material according to the present embodiment may be substantially free of $Li_2S$. This is because the sulfide-based solid electrolyte material that produces a less amount of hydrogen sulfide may be obtained. $Li_2S$ reacts with water to produce hydrogen sulfide. For example, when the content of $Li_2S$ in the material composition is high, $Li_2S$ tends to remain. The fact that "the sulfide-based solid electrolyte material is substantially free of $Li_2S$" may be confirmed through X-ray diffraction. Specifically, when there is no peak ($2\theta=27.0°$, $31.2°$, $44.8°$, $53.1°$) of $Li_2S$, it may be determined that the sulfide-based solid electrolyte material is substantially free of $Li_2S$.

The sulfide-based solid electrolyte material according to the present embodiment may be free of bridging sulfur. This is because the sulfide-based solid electrolyte material that produces a less amount of hydrogen sulfide may be obtained. The "bridging sulfur" is a bridging sulfur in a chemical compound that is formed by the reaction of $Li_2S$ and a sulfide of an element that belongs to group 13 to group 15. For example, a bridging sulfur in an $S_3P$—$S$—$PS_3$ unit formed by the reaction of $Li_2S$ and $P_2S_5$ corresponds to the "bridging sulfur". The above bridging sulfur tends to react with water and, therefore, tends to produce hydrogen sulfide. Furthermore, the fact that "the sulfide-based solid electrolyte material is substantially free of bridging sulfur" may be confirmed through Raman spectroscopy. For example, in the case of an $Li_2S$—$P_2S_5$-based solid electrolyte material, the peak of the $S_3P$—$S$—$PS_3$ unit normally appears at 402 $cm^{-1}$. Therefore, no peak may be detected at 402 $cm^{-1}$. In addition, the peak of the $PS_4$ unit normally appears at 417 $cm^{-1}$. In the present embodiment, the intensity $I_{402}$ at 402 $cm^{-1}$ may be lower than the intensity $I_{417}$ at 417 $cm^{-1}$. More specifically, for example, with respect to the intensity $I_{417}$, the intensity $I_{402}$ may be desirably lower than or equal to 70%, may be more desirably lower than or equal to 50%, and may be further desirably lower than or equal to 35%. In addition, in the case of a sulfide-based solid electrolyte material other than the $Li_2S$—$P_2S_5$-based solid electrolyte material as well, a unit that contains bridging sulfur is identified and then the peak of the unit is measured. By so doing, it is possible to determine that the sulfide-based solid electrolyte material is substantially free of bridging sulfur.

When the sulfide-based solid electrolyte material according to the present embodiment is substantially free of $Li_2S$ or bridging sulfur, the sulfide-based solid electrolyte material normally has an ortho composition or a composition close to the ortho composition. Here, the ortho generally indicates an oxoacid that has the highest degree of hydration among oxoacids obtained by hydrating the same oxide. In the present embodiment, a crystal composition of a sulfide having a largest amount of $Li_2S$ added is called ortho composition. For example, $Li_3PS_4$ corresponds to an ortho composition in an $Li_2S$—$P_2S_5$-based solid electrolyte material, $Li_3AlS_3$ corresponds to an ortho composition in an $Li_2S$—$Al_2S_3$-based solid electrolyte material, $Li_4SiS_4$ corresponds to an ortho composition in an $Li_2S$—$SiS_2$-based solid electrolyte material, and $Li_4GeS_4$ corresponds to an ortho composition in an $Li_2S$—$GeS_2$-based solid electrolyte material. Note that, in the ortho composition, the sulfide-based solid electrolyte material is theoretically formed of only the above described $MS_x$ unit. For example, in the case of an $Li_2S$—$P_2S_5$-based solid electrolyte material, the ratio of $Li_2S$ and $P_2S_5$ for obtaining an ortho composition is 75:25 on a molar basis. Similarly, in the case of an $Li_2S$—$Al_2S_3$-based solid electrolyte material, the ratio of $Li_2S$ and $Al_2S_3$ for obtaining an ortho composition is 75:25 on a molar basis. On the other hand, in the case of an $Li_2S$—$SiS_2$-based solid electrolyte material, the ratio of $Li_2S$ and $SiS_2$ for obtaining an ortho composition is 66.7:33.3 on a molar basis. Similarly, in the case of an $Li_2S$—$GeS_2$-based solid electrolyte material, the ratio of $Li_2S$ and $GeS_2$ for obtaining an ortho composition is 66.7:33.3 on a molar basis.

When the material composition contains $Li_2S$ and $P_2S_5$, the material composition may contain only $Li_2S$ and $P_2S_5$ or may further contain another chemical compound. The ratio of $Li_2S$ and $P_2S_5$ on a molar basis may range from 70:30 to 85:15, desirably may range from 70:30 to 80:20, and more desirably may range from 72:28 to 78:22. This is because the amount of produced hydrogen sulfide may be reduced in such a manner that the ratio of $Li_2S$ and $P_2S_5$ is set to fall within the range that includes the ratio for obtaining an ortho composition ($Li_2S$:$P_2S_5$=75:25) and its vicinity. Note that when the material composition contains $Li_2S$ and $Al_2S_3$, the ratio, and the like, of $Li_2S$ and $Al_2S_3$ may be equal to the above described ratio, and the like, of $Li_2S$ and $P_2S_5$.

On the other hand, when the material composition contains $Li_2S$ and $SiS_2$, the material composition may contain only $Li_2S$ and $SiS_2$ or may further contain another chemical compound. The ratio of $Li_2S$ and $SiS_2$ on a molar basis desirably may range from 50:50 to 80:20, more desirably may range from 55:45 to 75:25, and further desirably may range from 60:40 to 70:30. This is because the amount of produced hydrogen sulfide may be reduced in such a manner that the ratio of $Li_2S$ and $SiS_2$ is set to fall within the range that includes the ratio for obtaining an ortho composition ($Li_2S$:$SiS_2$=66.7:33.3) and its vicinity. Note that, when the material composition contains $Li_2S$ and $GeS_2$, the ratio, and the like, of $Li_2S$ and $GeS_2$ may be equal to the above described ratio, and the like, of $Li_2S$ and $SiS_2$.

The sulfide-based solid electrolyte material according to the present embodiment may be a sulfide glass that is formed by vitrifying the material composition or may be a crystallized sulfide glass that is formed by applying heat treatment to the above sulfide glass. The sulfide glass is softer than the crystallized sulfide glass, so it is considered that expansion and contraction of an active material may be absorbed when an all-solid battery is manufactured using the sulfide glass and therefore the cycle characteristic is excellent. On the other hand, the crystallized sulfide glass may be higher in lithium ion conductivity than the sulfide glass. Note that bridging sulfur or $Li_2S$ may be produced depending on the condition of heat treatment, so, in the present embodiment, heat treatment temperature and heat treatment time may be regulated so as not to produce bridging sulfur or $Li_2S$. The heat treatment temperature may be higher than or equal to 270° C., desirably may be higher than or equal to 280° C., and more desirably may be higher than or equal to 285° C. On the other hand, the heat treatment temperature may be lower than or equal to 310° C., desirably may be lower than or equal to 300° C., and more desirably may be lower than or equal to 295° C. In addition, the heat treatment time may fall within the range of a minute to two hours, and desirably may fall within the range of 30 minutes to an hour.

In addition, the sulfide-based solid electrolyte material may have a high lithium ion conductivity. The lithium ion conductivity at room temperature desirably may be higher than or equal to $10^{-5}$ S/cm, and more desirably may be higher than or equal to $10^{-4}$ S/cm. In addition, the sulfide-based solid electrolyte material according to the present embodiment is normally powdery, and the mean diameter of the powder sulfide-based solid electrolyte material may, for example, fall within the range of 0.1 μm to 50 μm.

2. Inhibitor

Next, the inhibitor according to the present embodiment will be described. The inhibitor according to the present embodiment is in contact with the sulfide-based solid electrolyte material and contains a metal element having an ionization tendency lower than that of hydrogen. The metal element of the inhibitor is not specifically limited as long as the metal element has an ionization tendency lower than that of hydrogen. The metal element may be, for example, Sb, Bi, Cu, Hg, Ag, Pd, Ir, Pt, Au, or the like, desirably may be at least any one of Cu, Sb, Bi, Hg and Ag, and more desirably may be Cu. This is because these metal elements are low in cost and have a high level of safety. In addition, the inhibitor according to the present embodiment may be an oxide, hydroxide, halide or metal salt of the metal element. The halide may be, for example, a fluoride, a chloride, a bromide, an iodide, or the like, and desirably may be a chloride. In addition, the metal salt may be, for example, a phosphate, a sulfate, an acetate, a nitrate, a bromate, or the like.

The shape of the inhibitor is not specifically limited. The shape of the inhibitor may be powdery, and the mean diameter of the powder of the inhibitor may, for example, fall within the range of 0.1 μm to 50 μm. In addition, the content of the inhibitor in the lithium ion conducting material may be higher than or equal to 5 percent by weight, desirably may be 10 percent by weight, and more desirably may be 20 percent by weight. This is because, when the content of the inhibitor is too low, a sulfur component may not be sufficiently stabilized before hydrogen sulfide is produced. Therefore, the amount of produced hydrogen sulfide may not be sufficiently inhibited. On the other hand, the content of the inhibitor in the lithium ion conducting material may be lower than or equal to 50 percent by weight, desirably may be 40 percent by weight, and more desirably may be 30 percent by weight. This is because, when the content of the inhibitor is too high, the inhibitor may deteriorate lithium ion conductivity. Note that the lithium ion conducting material according to the present embodiment may contain two or more types of inhibitor.

3. Lithium Ion Conducting Material

The lithium ion conducting material according to the present embodiment is not specifically limited as long as the lithium ion conducting material includes the sulfide-based solid electrolyte material and the inhibitor. Normally, both, that is, the sulfide-based solid electrolyte material and the inhibitor, are in contact with each other. Because of the contact between the sulfide-based solid electrolyte material and the inhibitor, a sulfur component may be sufficiently stabilized before hydrogen sulfide is produced. In addition, the shape of the lithium ion conducting material may be, for example, powdery, pelleted, or the like. When the lithium ion conducting material is pelleted, the lithium ion conducting material may be, for example, advantageously used as a solid electrolyte layer of an all-solid lithium battery. Note that the pelleted lithium ion conducting material is formed by pressing the powdery lithium ion conducting material.

An example of the powdery lithium ion conducting material may be a powdery lithium ion conducting material 10 in which the sulfide-based solid electrolyte material 1 and the inhibitor 2 are in contact with each other, as shown in FIG. 1. The powdery lithium ion conducting material may be obtained by simply mixing the sulfide-based solid electrolyte material 1 and the inhibitor 2. In addition, in this case, the sulfide-based solid electrolyte material 1 and the inhibitor 2 may be highly dispersed from each other. This is because a sulfur component may be efficiently stabilized before hydrogen sulfide is produced. In addition, in the present embodiment, the surface of one of the sulfide-based solid electrolyte material and the inhibitor may be covered with the other one in a floating island shape. The covered lithium ion conducting material may be, for example, obtained by applying and drying through sol-gel process, Pulsed Laser Deposition (PLD), sputtering, or the like.

Figure 2A:
FIG. 2A and FIG. 2B are schematic cross-sectional views that respectively show examples of the lithium ion conducting material according to the embodiment of the invention.

On the other hand, an example of the pelleted lithium ion conducting material may be a pelleted lithium ion conducting material 10 in which the sulfide-based solid electrolyte material and the inhibitor are in contact with each other, as shown in FIG. 2A. The pelleted lithium ion conducting material may be, for example, formed by compressing the powdery lithium ion conducting material shown in FIG. 1.

In addition, the pelleted lithium ion conducting material may be formed so that the sulfide-based solid electrolyte material and the inhibitor are not mixed with each other. The above pelleted lithium ion conducting material may, for example, include a sulfide-based solid electrolyte material containing portion that at least contains a sulfide-based solid electrolyte material and an inhibitor containing portion that at least contains an inhibitor, wherein the sulfide-based solid electrolyte material containing portion and the inhibitor containing portion are in contact with each other.

Figure 2B:
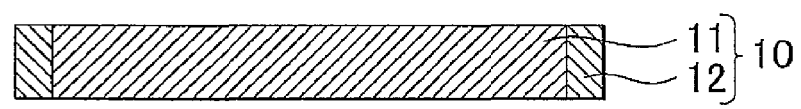

An example of the pelleted lithium ion conducting material may include a sulfide-based solid electrolyte material containing portion 11 that at least contains a sulfide-based solid electrolyte material and an inhibitor containing portion 12 that at least contains an inhibitor and that is formed on end surfaces of the sulfide-based solid electrolyte material containing portion 11, as shown in FIG. 2B. The end surfaces of the lithium ion conducting material 10 shown in FIG. 2B are susceptible to water, so the inhibitor containing portion 12 is provided on the end surfaces to thereby make it possible to effectively inhibit production of hydrogen sulfide. The pelleted lithium ion conducting material 10 may be, for example, obtained in such a manner that a material that constitutes the sulfide-based solid electrolyte material containing portion 11 and a material that constitutes the inhibitor containing portion 12 are prepared, the material that constitutes the inhibitor containing portion 12 is arranged around the material that constitutes the sulfide-based solid electrolyte material containing portion 11 and then these materials are compressed at a time. Note that the pelleted lithium ion conducting material may be prepared in such a manner that one of the sulfide-based solid electrolyte material containing portion 11 and the inhibitor containing portion 12 is formed by first compression molding, the material of the other one is added to the obtained compact and then second compression molding is performed.

In addition, the sulfide-based solid electrolyte material containing portion 11 may contain only the sulfide-based solid electrolyte material or may further contain another material. Similarly, the inhibitor containing portion 12 may contain only the inhibitor or may further contain another material. Another material used for the sulfide-based solid electrolyte material containing portion 11 and the inhibitor containing portion 12 may be, for example, a binding agent, or the like. In addition, by adding an active material as another material, it is possible to obtain a pelleted lithium ion conducting material that is useful as a positive electrode active material layer or a negative electrode active material layer. In this case, a conducting material may be further added as another material.

B. Lithium Battery

Next, the lithium battery according to the present embodiment will be described. The lithium battery according to the present embodiment includes a positive electrode active material layer that contains a positive electrode active material, a negative electrode active material layer that contains a negative electrode active material, and an electrolyte layer that is formed between the positive electrode active material layer and the negative electrode active material layer, wherein at least one of the positive electrode active material layer, the negative electrode active material layer and the electrolyte layer contains the above described lithium ion conducting material.

According to the above embodiment, by using the above described lithium ion conducting material, the lithium battery that produces a less amount of hydrogen sulfide may be obtained.

Figure 3:
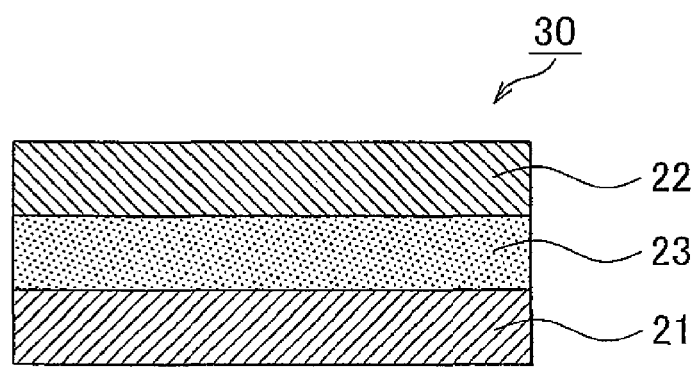
FIG. 3 is a schematic cross-sectional view that shows an example of a power generating element of a lithium battery according to the embodiment of the invention.

A power generating element 30 shown in FIG. 3 includes a positive electrode active material layer 21 that contains a positive electrode active material, a negative electrode active material layer 22 that contains a negative electrode active material, and an electrolyte layer 23 that is formed between the positive electrode active material layer 21 and the negative electrode active material layer 22. Furthermore, in the present embodiment, at least one of the positive electrode active material layer 21, the negative electrode active material layer 22 and the electrolyte layer 23 contains the above described lithium ion conducting material. Hereinafter, the lithium battery according to the present embodiment will be described component by component.

1. Electrolyte Layer

First, the electrolyte layer according to the present embodiment will be described. The electrolyte layer according to the present embodiment is formed between the positive electrode active material layer and the negative electrode active material layer. The electrolyte layer is not specifically limited as long as the layer is able to conduct lithium ions. The electrolyte layer may be a solid electrolyte layer. This is because a lithium battery (all-solid battery) having a high level of safety may be obtained. Furthermore, in the present embodiment, the solid electrolyte layer may contain the above described lithium ion conducting material. The content of the lithium ion conducting material in the solid electrolyte layer may range from 10 percent by volume to 100 percent by volume, and desirably may range from 50 percent by volume to 100 percent by volume. In the present embodiment, the solid electrolyte layer may be formed of only the lithium ion conducting material. This is because a lithium battery that produces a less amount of hydrogen sulfide may be obtained. The thickness of the solid electrolyte layer may range from 0.1 µm to 1000 µm, and desirably may range from 0.1 µm to 300 µm. In addition, a method of forming the solid electrolyte layer may be, for example, a method of forming the lithium ion conducting material by compression molding.

In addition, the electrolyte layer according to the present embodiment may be formed of an electrolytic solution. By using an electrolytic solution, a high-power lithium battery may be obtained. In this case, normally, at least one of the positive electrode active material layer and the negative electrode active material layer contains the above described lithium ion conducting material. In addition, the electrolytic solution normally contains lithium salt and an organic solvent (nonaqueous solvent). The lithium salt may be, for example, inorganic lithium salt, such as $LiPF_6$, $LiBF_4$, $LiClO_4$ and $LiAsF_6$, or organic lithium salt, such as $LiCF_3SO_3$, $LiN(CF_3SO_2)_2$, $LiN(C_2F_5SO_2)_2$ and $LiC(CF_3SO_2)_3$. The organic solvent may be, for example, ethylene carbonate (EC), propylene carbonate (PC), dimethyl carbonate (DMC), diethyl carbonate (DEC), ethylmethyl carbonate (EMC) or butylene carbonate (BC).

2. Positive Electrode Active Material Layer

Next, the positive electrode active material layer according to the present embodiment will be described. The positive electrode active material layer at least contains a positive electrode active material and, where necessary, may contain at least one of a solid electrolyte material, a conducting material and a binding agent. Particularly, in the present embodiment, the positive electrode active material layer may contain the above described lithium ion conducting material. This is because a lithium battery that produces a less amount of hydrogen sulfide may be obtained. The content of the lithium ion conducting material in the positive electrode active material layer varies depending on the type of lithium battery. The content of the lithium ion conducting material may range from 0.1 percent by volume to 80 percent by volume, desirably may range from 1 percent by volume to 60 percent by volume, and more desirably may range from 10 percent by volume to 50 percent by volume. In addition, the positive electrode active material may be, for example, $LiCoO_2$, $LiMnO_2$, $Li_2NiMn_3O_8$, $LiVO_2$, $LiCrO_2$, $LiFePO_4$, $LiCoPO_4$, $LiNiO_2$, $LiNi_{1/3}Co_{1/3}Mn_{1/3}O_2$, or the like.

The positive electrode active material layer according to the present embodiment may further contain a conducting material. By adding the conducting material, it is possible to improve the conductivity of the positive electrode active material layer. The conducting material is, for example, acetylene black, Ketjen black, carbon fiber, or the like. In addition, the positive electrode active material layer may contain a binding agent. The type of binding agent may be, for example, a binding agent containing fluorine, or the like. In addition, the thickness of the positive electrode active material layer may range from 0.1 µm to 1000 µm.

3. Negative Electrode Active Material Layer

Next, the negative electrode active material layer according to the present embodiment will be described. The negative electrode active material layer according to the present embodiment at least contains a negative electrode active material and, where necessary, may contain at least one of a solid electrolyte material, a conducting material and a binding agent. Particularly, in the present embodiment, the negative electrode active material layer may contain the above described lithium ion conducting material. This is because a lithium battery that produces a less amount of hydrogen sulfide may be obtained. The content of the lithium ion conducting material in the negative electrode active material layer varies depending on the type of lithium battery. The content of the lithium ion conducting material may, for example, range from 0.1 percent by volume to 80 percent by volume, desirably may range from 1 percent by volume to 60 percent by volume, and more desirably may range from 10 percent by volume to 50 percent by volume. In addition, the negative electrode active material may be, for example, a metal active material or a carbon active material. The metal active material may be, for example, In, Al, Si, Sn, or the like. On the other hand, the carbon active material may be, for example, mesocarbon microbead (MCMB), highly oriented graphite (HOPG), hard carbon, soft carbon, or the like. Note that the conducting material and the binding agent that are used for the negative electrode active material layer are similar to those used for the above described positive electrode active material layer. In addition, the thickness of the negative electrode active material layer may, for example, range from 0.1 µm to 1000 µm.

4. Other Components

The lithium battery according to the present embodiment at least includes the above described positive electrode active material layer, electrolyte layer and negative electrode active material layer. Furthermore, normally, the lithium battery includes a positive electrode current collector and a negative electrode current collector. The positive electrode current collector collects current from the positive electrode active material layer. The negative electrode current collector collects current from the negative electrode active material. The material of the positive electrode current collector may be Stainless Used Steel (SUS), aluminum, nickel, iron, titanium, carbon, or the like, and desirably may be SUS. On the other hand, the material of the negative electrode current collector may be SUS, copper, nickel, carbon, or the like, and desirably may be SUS. In addition, the thickness, shape, and the like, of each of the positive electrode current collector and the negative electrode current collector may be selected appropriately on the basis of an application, or the like, of the lithium battery. In addition, a battery case used in the present embodiment may be a typical battery case for a lithium battery. The battery case may be, for example, a SUS battery case, or the like. In addition, when the lithium battery according to the present embodiment is an all-solid battery, the power generating element may be formed inside an insulating ring.

5. Lithium Battery

The lithium battery according to the present embodiment may be a primary battery or may be a secondary battery, and desirably may be a secondary battery. This is because the secondary battery may be repeatedly charged or discharged, and is useful as, for example, an in-vehicle battery. The shape of the lithium battery according to the present embodiment may be, for example, a coin shape, a laminated shape, a cylindrical shape, a square shape, or the like.

In addition, a method of manufacturing the lithium battery according to the present embodiment is not specifically limited as long as the above described lithium battery may be obtained. The method of manufacturing the lithium battery may be a method similar to a typical method of manufacturing a lithium battery. For example, when the lithium battery according to the present embodiment is an all-solid battery, an example of the manufacturing method for the lithium battery may be a method in which a power generating element is prepared by sequentially pressing a material that constitutes a positive electrode active material layer, a material that constitutes a solid electrolyte layer and a material that constitutes a negative electrode active material layer, the power generating element is accommodated inside a battery case and then the battery case is crimped. In addition, in the present embodiment, it is possible to separately provide the positive electrode active material layer, negative electrode active material layer and solid electrolyte layer that contain the above described lithium ion conducting material.

Note that the aspect of the invention is not limited to the above embodiment. The above described embodiment is only illustrative. The scope of the invention encompasses any embodiment that includes substantially equivalent components and has substantially similar advantageous effects to those of the technical ideas recited in the appended claims.

Hereinafter, the aspect of the invention will be more specifically described with reference to an example.

EXAMPLE

Lithium sulfide ($Li_2S$) and phosphorus pentasulfide ($P_2S_5$) were used as starting materials. The powder of them were weighted in a glove box in an atmosphere of argon so that the mole ratio becomes $Li_2S:P_2S_5=75:25$ and then these were mixed in an agate mortar. By so doing, 1 g material composition was obtained. Subsequently, the obtained 1 g material composition was put into a 45 ml zirconia pot, zirconia balls ($\Phi$10 mm, ten balls) were further put into the pot and then the pot was completely hermetically sealed. The pot was mounted on a planetary ball milling machine. Then, mechanical milling was performed at a turning table rotational speed of 370 rpm for 40 hours. By so doing, the sulfide-based solid electrolyte material ($75Li_2S \cdot 25P_2S_5$ glass) was obtained. Subsequently, copper oxide (CuO) that serves as an inhibitor was added to the obtained sulfide-based solid electrolyte material so as to become 30 percent by weight, and then these were mixed in an agate mortar. By so doing, the lithium ion conducting material was obtained.

First Comparative Example

The sulfide-based solid electrolyte material ($75Li_2S \cdot 25P_2S_5$ glass) in the above example was prepared as a comparative sample.

Evaluation 1

Measurement of Amount of Produced Hydrogen Sulfide

Figure 4:
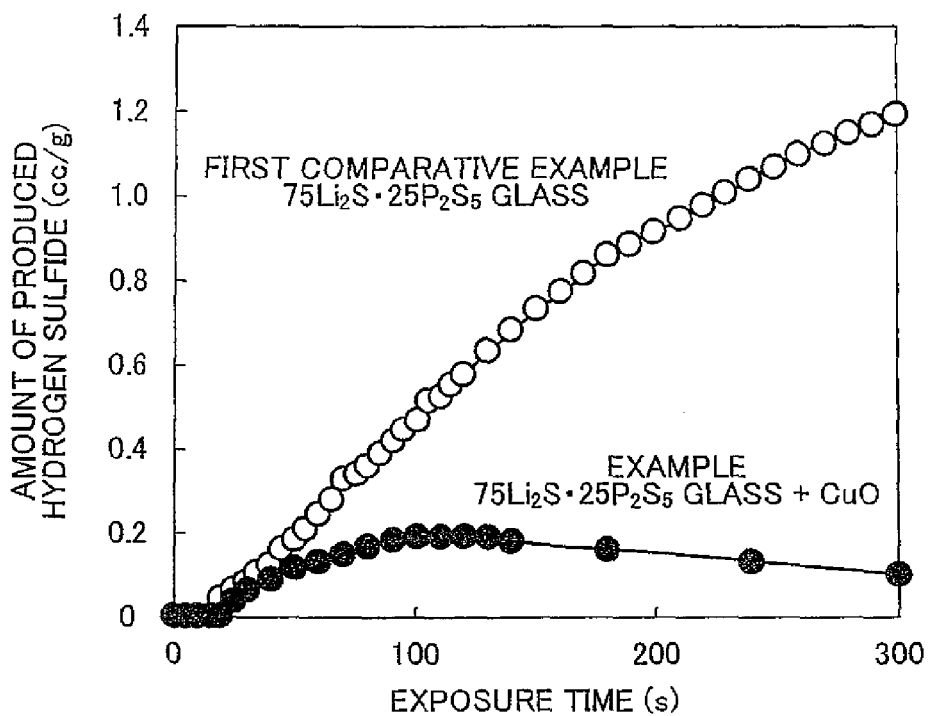
FIG. 4 is a graph that shows the results of the amounts of produced hydrogen sulfide of samples, measured in an example and a first comparative example.

The amount of produced hydrogen sulfide was measured for the samples obtained in the example and the first comparative example. The amount of produced hydrogen sulfide was measured as follows. That is, 100 mg powder of the sulfide-based solid electrolyte material was weighted, the powder was put in a hermetically sealed 1755 cc desiccator (atmosphere of air, temperature 25° C., humidity 50%), and then the amount of produced hydrogen sulfide was measured by a hydrogen sulfide detection sensor (product number: GX-2009 produced by Riken Keiki Co., Ltd.). The results are shown in FIG. 4. As is apparent from FIG. 4, it was confirmed that the amount of produced hydrogen sulfide is significantly reduced in the example as compared with the first comparative example.

X-ray Diffractometry

Figure 5:
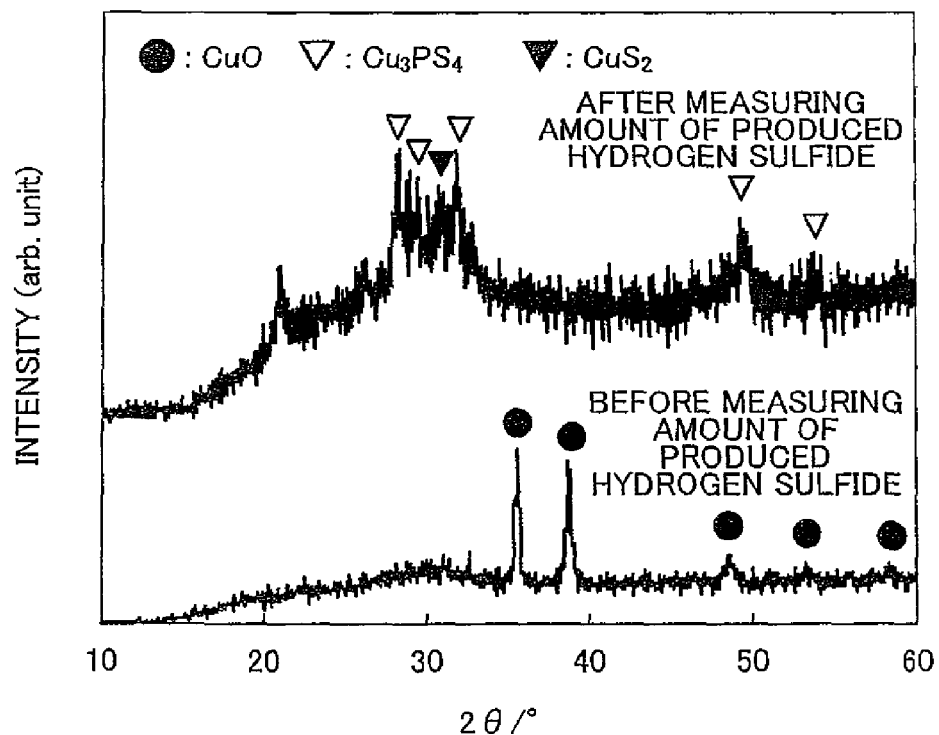
FIG. 5 is a graph that shows the results of X-ray diffractometry before and after measuring the amount of produced hydrogen sulfide of the sample, obtained in the example.
Figure 6:
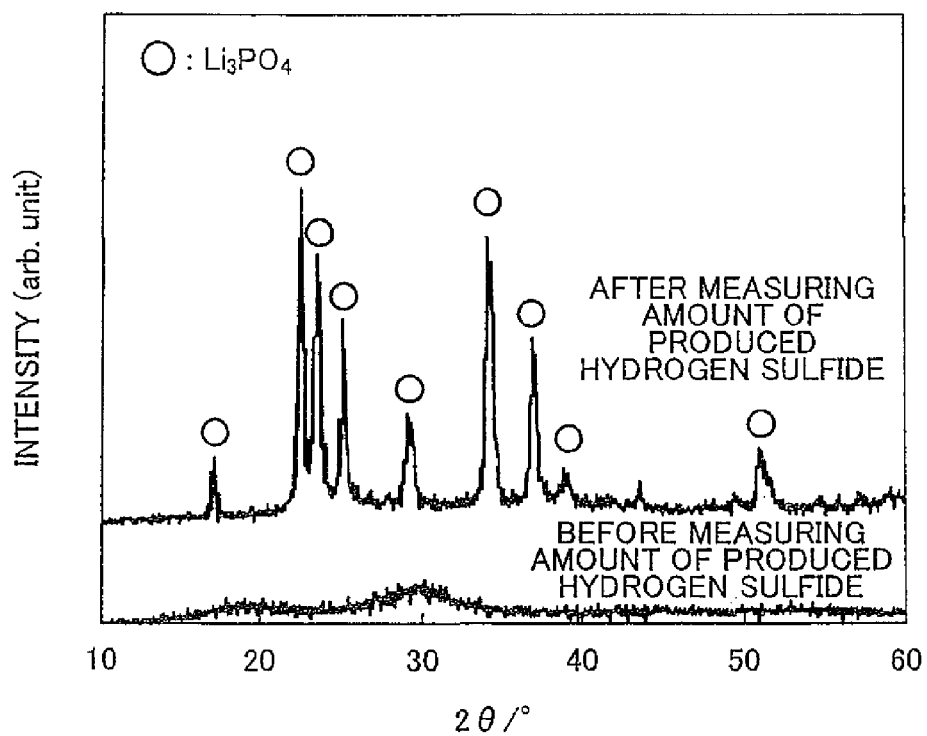
FIG. 6 is a graph that shows the results of X-ray diffractometry before and after measuring the amount of produced hydrogen sulfide of the sample, obtained in the first comparative example.

The samples obtained in the example and the first comparative example were subjected to X-ray diffractometry. Note that the samples before and after measuring the amount of produced hydrogen sulfide were used for X-ray diffractometry. In addition, because the moisture of the sample after measuring the amount of produced hydrogen sulfide was taken up, the sample was subjected to X-ray diffractometry after drying in a vacuum. The results are shown in FIG. 5 and FIG. 6. As shown in FIG. 5, in the example, for the sample before measuring the amount of produced hydrogen sulfide, the peak of CuO was confirmed. In addition, for the sample after measuring the amount of produced hydrogen sulfide, it was confirmed that $Cu_3PS_4$ and $CuS_2$ are produced and CuO has disappeared. On the other hand, as shown in FIG. 6, in the first comparative example, for the sample after measuring the amount of produced hydrogen sulfide, the peak of $Li_3PO_4$ was confirmed.

Measurement of Lithium Ion Conductivity

The lithium ion conductivity of each of the samples obtained in the example and the first comparative example was measured. The lithium ion conductivity was measured as follows. That is, the powder of the obtained samples was formed into a pellet and then the lithium ion conductivity of each sample was measured at room temperature by alternating-current impedance method. The results are shown as follows.

TABLE 1

|  | Composition | Li Ion Conductivity (S/cm) |
|---|---|---|
| Example | 75Li$_2$S·25P$_2$S$_5$ Glass + CuO | 3.3 × 10$^{-4}$ |
| Comparative Example | 75Li$_2$S·25P$_2$S$_5$ Glass | 5.5 × 10$^{-4}$ |

As shown in Table 1, it was confirmed that the lithium ion conducting material that contains CuO, as well as the comparative sample that contains no CuO, has a lithium ion conductivity of 10$^{-4}$ S/cm or above.

Second Comparative Example

Fe$_2$O$_3$ that is an oxide of a metal element having an ionization tendency higher than that of hydrogen was added to the sulfide-based solid electrolyte material (75Li$_2$S.25P$_2$S$_5$ glass) prepared in the example so as to become 30 percent by weight, and then these were mixed in an agate mortar. By so doing, the lithium ion conducting material was obtained.

Evaluation 2

Figure 7:
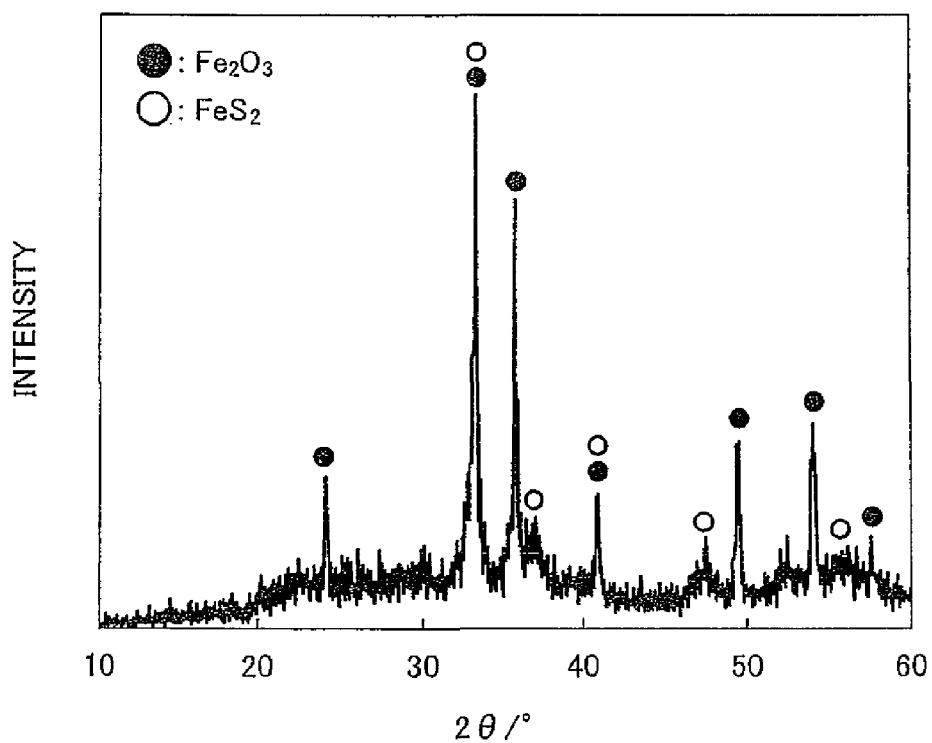
FIG. 7 is a graph that shows the results of X-ray diffractometry after measuring the amount of produced hydrogen sulfide of a sample, obtained in a second comparative example.

The sample obtained in the second comparative example was subjected to X-ray diffractometry. Note that the sample after measuring the amount of produced hydrogen sulfide was used for X-ray diffractometry. In addition, because the moisture of the sample after measuring the amount of produced hydrogen sulfide was taken up, the sample was subjected to X-ray diffractometry after drying in a vacuum. The results are shown in FIG. 7. As shown in FIG. 7, the peak of FeS$_2$ was confirmed. Therefore, it was confirmed that, when Fe$_2$O$_3$ is used, not the PS$_4$ unit is trapped like the example but hydrogen sulfide is trapped.

The invention claimed is:

1. A lithium ion conducting material comprising:
   a sulfide-based solid electrolyte material that contains Li, an element of group 13 to group 15 and S, and that contains an MS$_x$ unit, wherein M is an element that belongs to group 13 to group 15, S is a sulfur element, and x is the maximum number of S atoms that can be bonded with M; and
   an inhibitor that is in direct contact with the sulfide-based solid electrolyte material and that contains a metal element having an ionization tendency lower than that of hydrogen.

2. The lithium ion conducting material according to claim 1, wherein the inhibitor traps a sulfur component before hydrogen sulfide is produced.

3. The lithium ion conducting material according to claim 1, wherein the metal element of the inhibitor is at least one of Cu, Sb, Bi, Hg and Ag.

4. The lithium ion conducting material according to claim 1, wherein the metal element of the inhibitor is copper.

5. The lithium ion conducting material according to claim 1, wherein the inhibitor is copper oxide.

6. The lithium ion conducting material according to claim 1, wherein the content of the inhibitor in the lithium ion conducting material ranges from 20 percent by weight to 30 percent by weight.

7. The lithium ion conducting material according to claim 1, wherein the sulfide-based solid electrolyte material is substantially free of bridging sulfur or Li2S.

8. The lithium ion conducting material according to claim 1, wherein the sulfide-based solid electrolyte material has an ortho composition.

9. The lithium ion conducting material according to claim 1, wherein the inhibitor is formed on an end surface of the sulfide-based solid electrolyte material.

10. The lithium ion conducting material according to claim 1, wherein the element of group 13 to group 15 is P, and the MS$_x$ unit is a PS$_4$ unit.

11. The lithium ion conducting material according to claim 10, wherein the sulfide-based solid electrolyte material is formed by vitrifying a material composition that contains Li$_2$S and P$_2$S$_5$.

12. The lithium ion conducting material according to claim 11, wherein the ratio of Li$_2$S and P$_2$S$_5$ contained in the material composition is Li$_2$S:P$_2$S$_5$=70:30 to 85:15 on a molar basis.

13. The lithium ion conducting material according to claim 1, wherein the element of group 13 to group 15 is Ge, and the MS$_x$ unit is a GeS$_4$ unit.

14. The lithium ion conducting material according to claim 13, wherein the sulfide-based solid electrolyte material is formed by vitrifying a material composition that contains Li$_2$S and GeS$_2$.

15. The lithium ion conducting material according to claim 14, wherein the ratio of Li$_2$S and GeS$_2$ contained in the material composition is Li$_2$S:GeS$_2$=50:50 to 80:20 on a molar basis.

16. The lithium ion conducting material according to claim 1, wherein the element of group 13 to group 15 is Si, and the MS$_x$ unit is an SiS$_4$ unit.

17. The lithium ion conducting material according to claim 16, wherein the sulfide-based solid electrolyte material is formed by vitrifying a material composition that contains Li$_2$S and SiS$_2$.

18. The lithium ion conducting material according to claim 17, wherein the ratio of Li$_2$S and SiS$_2$ contained in the material composition is Li$_2$S:SiS$_2$=50:50 to 80:20 on a molar basis.

19. A lithium battery comprising:
   a positive electrode active material layer that contains a positive electrode active material;
   a negative electrode active material layer that contains a negative electrode active material; and
   an electrolyte layer that is formed between the positive electrode active material layer and the negative electrode active material layer, wherein
   at least one of the positive electrode active material layer, the negative electrode active material layer and the electrolyte layer contains the lithium ion conducting material according to claim 1.

20. The lithium ion conducting material according to claim 1, wherein the inhibitor is in a mixture with the sulfide-based electrolyte material.

* * * * *